(12) United States Patent
Shim et al.

(10) Patent No.: US 8,634,382 B2
(45) Date of Patent: Jan. 21, 2014

(54) STATION DEVICE AND METHOD OF CHECKING COMMUNICATION PERFORMANCE THEREOF

(75) Inventors: Seung-seop Shim, Anyang-si (KR); Hyun-su Park, Seoul (KR); Yun-seoph Kim, Incheon (KR); Deok-nam Kim, Suwon-si (KR); Hyung-seok Han, Yongin-si (KR); Sang-u Shim, Hwaseong-si (KR); Moo-hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 13/035,578

(22) Filed: Feb. 25, 2011

(65) Prior Publication Data

US 2011/0317573 A1 Dec. 29, 2011

(30) Foreign Application Priority Data

Jun. 29, 2010 (KR) .................. 10-2010-0062120

(51) Int. Cl.
*H04W 4/00* (2009.01)
(52) U.S. Cl.
USPC .......................................................... 370/331

(58) Field of Classification Search
None
See application file for complete search history.

(56) References Cited

U.S. PATENT DOCUMENTS

| 7,206,294 B2 * | 4/2007 | Garahi et al. ................. 370/315 |
| 7,567,822 B2 | 7/2009 | Hart et al. |
| 2005/0105474 A1 | 5/2005 | Metzler |
| 2006/0291424 A1 * | 12/2006 | Park et al. ..................... 370/331 |
| 2012/0157147 A1 * | 6/2012 | Christoffersson et al. .... 455/517 |

OTHER PUBLICATIONS

Communication, dated Nov. 24, 2011, issued by the European Patent Office in corresponding European Application No. 11171226.1.

* cited by examiner

*Primary Examiner* — Raj Jain
(74) *Attorney, Agent, or Firm* — Sughrue Mion, PLLC

(57) ABSTRACT

A station device includes an output unit that outputs a massage, a communication unit that communicates with a wireless access point which is movable from one place to another place, a determination unit that determines current communication performance with the wireless access point, a storage unit that stores the determined current communication performance, and a controller that compares the current communication performance with pre-stored previous communication performance and controls the output unit to output a message according to a result of the comparison.

11 Claims, 7 Drawing Sheets

STATION DEVICE AND METHOD OF CHECKING COMMUNICATION PERFORMANCE THEREOF

CROSS-REFERENCE TO RELATED APPLICATION

This application claims priority from Korean Patent Application No. 10-2010-0062120, filed on Jun. 29, 2010 in the Korean Intellectual Property Office, the entire disclosure of which is incorporated herein by reference in its entirety.

BACKGROUND

1. Field

Apparatuses and methods consistent with exemplary embodiments relate to a station device and a method for checking communication performance thereof, and more particularly, to a station device which can check communication performance at various locations of a wireless access point, and a method for checking communication performance thereof.

2. Description of the Related Art

As demand for mobile devices such as laptop computers or personal digital assistants (PDAs) increases, wireless local area networks (WLANs) for wireless communication through radio signals or an infrared signals are widely used.

The WLAN enables users to have enhanced mobility. However, WLAN communication performance is susceptible to environmental factors in comparison with a wired LAN.

In a related-art method for measuring communication performance using a WLAN, a server transmits a packet to a client via a wireless access point and receives the packet returning from the client via the wireless access point.

However, there is a problem in that the related-art method requires both the server and the client in order to measure the communication performance.

Also, there is a need for a method for measuring communication performance in an improved manner and for checking an optimal location of a wireless access point using the measured communication performance.

SUMMARY

Exemplary embodiments overcome the above disadvantages and other disadvantages not described above. However, it is understood that an exemplary embodiment is not required to overcome the disadvantages described above, and an exemplary embodiment may not overcome any of the problems described above.

One or more exemplary embodiments provide a station device which can check communication performance of a wireless access point on a real time basis, and a method for checking communication performance thereof.

In accordance with an aspect of an exemplary embodiment, there is provided a method for checking communication performance of a station device, the method including: communicating with a wireless access point which is movable from one place to another place, determining current communication performance with the wireless access point, storing the determined current communication performance, comparing the current communication performance with pre-stored previous communication performance, and performing an output according to a result of the comparison.

The performing the output according to the result of the comparison may include: outputting a first message, if the current communication performance is better than the previous communication performance, and outputting a second message, if the current communication performance is the same as the previous communication performance.

The performing the output according to the result of the comparison may include not outputting a message, if the current communication performance is worse than the previous communication performance.

The determining the current communication performance may include: iterating an operation of transmitting a test packet to the wireless access point and receiving the test packet returning from the wireless access point a predetermined number of times, checking a number of packets that are damaged during the operation of iterating, and determining the current communication performance according the number of damaged packets.

The method may further include, by the station device, reducing a size of a packet to be transmitted next if a damaged packet is generated, and increasing the size of the packet to be transmitted next if the transmitting of the test packet is successful.

The determining the current communication performance may include: measuring a strength or a signal to noise ratio (SNR) of a signal received from the wireless access point, and determining the current communication performance according to a result of the measurement.

The station device may include a television that communicates with the wireless access point wirelessly.

In accordance with an aspect of another exemplary embodiment, there is provided a method for setting a location of a wireless access point, the method including: fixing a station device in an environment where the wireless access point is to be installed and placing the wireless access point at a predetermined location, communicating between the wireless access point and the station device, and retaining or changing the location of the wireless access point by checking a message output from the station device according to a result of comparison of current communication performance with previous communication performance.

In accordance with an aspect of another exemplary embodiment, there is provided a station device including: an output unit that outputs a massage, a communication unit that communicates with a movable wireless access point, a determination unit that determines current communication performance with the wireless access point, a storage unit that stores the determined current communication performance, and a controller that compares the current communication performance with pre-stored previous communication performance and controls the output unit to output a message according to a result of the comparison.

The controller may control the output unit to output a first message if the current communication performance is better than the previous communication performance and output a second message if the current communication performance is the same as the previous communication performance.

The controller may not output a message if the current communication performance is worse than the previous communication performance.

The controller may control the communication unit to iterate an operation of transmitting a test packet to the wireless access point and receiving the test packet returning from the wireless access point a predetermined number of times, and the determination unit may check a number of packets that are damaged during the operation of iterating and determine the current communication performance according to the number of damaged packets.

The controller may reduce a size of a packet to be transmitted next if a damaged packet is generated, and increase the size of the packet to be transmitted next if the transmitting of the test packet is successful.

The determination unit may measure a strength or a signal to noise ratio (SNR) of a signal received from the wireless access point and determine the current communication performance according to a result of the measurement.

The station device may include a television that communicates with the wireless access point wirelessly.

BRIEF DESCRIPTION OF THE DRAWING

The above and/or other aspects will be more apparent from the following description of exemplary embodiments taken in conjunction with the accompanying drawings in which.

DETAILED DESCRIPTION OF EXEMPLARY EMBODIMENTS

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the invention with unnecessary detail.

Figure 1:
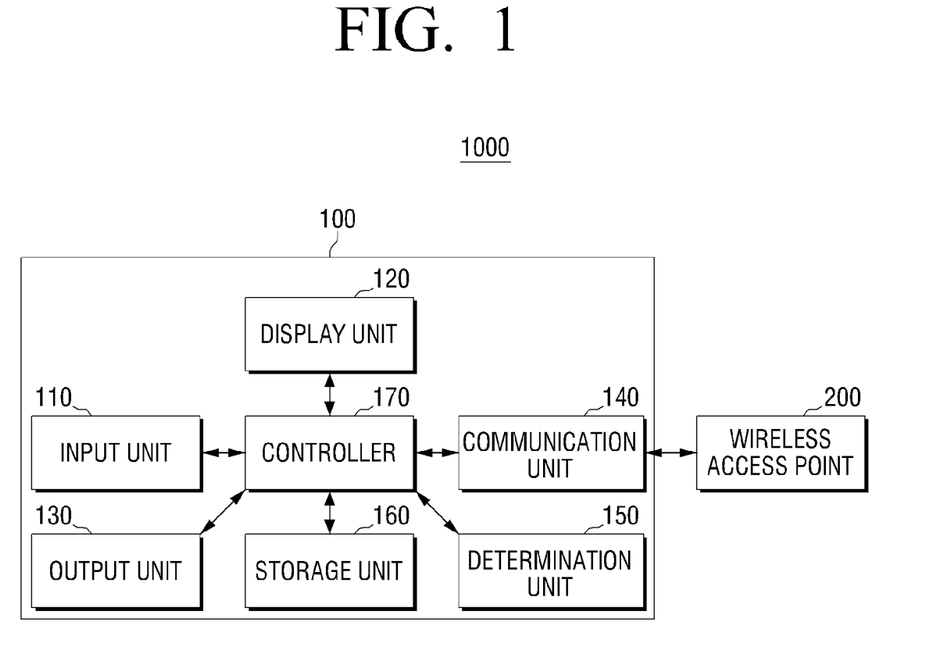
FIG. 1 is a block diagram illustrating a wireless communication system according to an exemplary embodiment.

FIG. 1 is a block diagram illustrating a wireless communication system according to an exemplary embodiment.

Referring to FIG. 1, a wireless communication system 1000 includes a station device 100 and a wireless access point 200.

In the wireless communication system 1000 according to an exemplary embodiment, the station device 100 receives a signal from the wireless access point 200, which is placed at various locations, thereby measuring communication performance of the wireless access point 200. Thus, it may be preferable that the station device 100 is fixed in a place and the wireless access point 200 is movable from one place to another place.

The station device 100 according to an exemplary embodiment includes an input unit 110, a display unit 120, an output unit 130, a communication unit 140, a determination unit 150, a storage unit 160, and a controller 170.

The input unit 110 may receive various commands from a user.

For example, the input unit 110 may receive a user's command to measure the communication performance between the station device 100 and the wireless access point 200 from a device such as a remote controller, a key board, or a mouse of the station device 100.

Also, the input unit 110 may receive a user's command to measure the communication performance according to one of various methods for measuring communication performance, or may receive the number of iterations of an operation of measuring the communication performance.

The display unit 120 displays an image.

Upon receiving a user command through the input unit 110, the display unit 120 displays a screen for measuring the communication performance.

The output unit 130 outputs a message.

The output unit 130 may display the message on a screen of the station device 100 in the form of text or a graphical user interface (GUI). In this case, the output unit 130 may be the display unit 120.

The output unit 130 may output an audible sound, such as a beep, through a speaker of the station device 100 as a message. However, the exemplary embodiments are not limited to the above message examples and may provide messages in other forms.

The communication unit 140 communicates with the wireless access point 200 which is movable from one place to another place. The communication unit 140 may be a wireless communication unit for wirelessly communicating with the wireless access point 200.

The communication unit 140 transmits a test packet to the wireless access point 200 and receives the test packet returning from the wireless access point 200. In this case, the communication unit 140 may broadcast the test packet to the wireless access point 200.

The communication unit 140 may include a network interface card (NIC) mounted or embedded therein.

The determination unit 150 determines current communication performance of the station device 100 with the wireless access point 200.

As one example, the determination unit 150 may check the number of packets that are damaged during the process of iterating the operation of transmitting the test packet to the wireless access point 200 and receiving the test packet returning from the wireless access point 200, and determine the current communication performance according to the number of damaged packets received. The process of iterating the operation of transmitting and receiving the test packet may be a loop back mechanism.

As another example, the determination unit 150 may measure a strength of a signal received from the wireless access point 200 and determine the current communication performance according to the measured strength of the signal.

As still another example, the determination unit 150 may measure a signal to noise ratio (SNR) of a signal received from the wireless access point 200 and determine the current communication performance according to the measured SNR.

The storage unit 160 stores the determined current communication performance.

The storage unit 160 may store a program for measuring communication performance, the number of iterations of packet transmission, the number of transmitted packets, the number of damaged packets, a strength of a received signal, an SNR, a size of a transmitted data packet, and Internet protocol (IP) addresses of the station device 100 and the wireless access point 200. Also, the storage unit 160 may store location information of the wireless access point 200 at each location or map information including the location information, if the wireless access point 200 is placed in a limited space.

The controller 170 controls an overall operation of the station device 100.

The controller 170 compares the current communication performance with pre-stored previous communication performance and controls the output unit 130 to output a message according to a result of comparison.

The controller 170 may control the output unit 130 to output a first message if the current communication performance is better than the previous communication performance and to output a second message if the current communication performance is the same as the previous communication performance. Also, the controller 170 may not output a message if the current communication performance is worse than the previous communication performance.

A determination of better current communication performance may be based on receiving fewer damaged packets, higher measured received signal strength, and higher received signal to noise ratio (SNR), than the previous communication performance. On the other hand, a determination of worse current communication performance may be based on receiving more damaged packets, lower measured received signal strength, and lower received signal to noise ratio (SNR), than the previous communication performance.

Accordingly, the station device 100 is able to check whether the communication performance at various locations of the wireless access point 200 is better than the previous best communication performance on a real time basis, thereby enhancing user's convenience.

The controller 170 may control the communication unit 140 to iterate the operation of transmitting the test packet to the wireless access point 200 and receiving the test packet returning from the wireless access point 200 a predetermined number of times.

The controller 170 may reduce a size of a packet to be transmitted next if a damaged packet is generated during the process of iterating the above operation, and may increase the size of the packet to be transmitted next if the packet transmission is successful.

The wireless communication system 1000 is able to directly receive an Ethernet signal at the station device 100 via a wired LAN. In this case, the wireless access point 200 may transmit the Ethernet signal to a mobile device (not show), for example but not limited to a laptop computer or a smart phone.

The wireless communication system 1000 may further include a host device (not shown) connected to the wireless access point 200 by wire or wirelessly. Accordingly, the wireless access point 200 may transmit an Ethernet signal received from the host device (not shown) to the station device 100.

The station device 100 may be realized as a television or a personal computer.

The station device 100 may be a wireless station device that can communicate with the wireless access point 200 wirelessly.

The wireless access point 200 receives the test packet from the station device 100 and returns the test packet to the station device 100.

The wireless access point 200 may further include a communication interface (not shown) that can communicate with the station device 100, and may further include a power supply unit (not shown) to be supplied with power by wire or wirelessly. The power supply unit (not shown) may receive power from an external power source by wire or receive power wirelessly by means of a wireless charging system.

According to an exemplary embodiment, the network performance between the station device 100 and the wireless access point 200 can be measured even when the wireless access point 200 is moved from one place to another place, and the operation of transmitting the packet is iterated so that the network performance can be measured more accurately.

Although the wireless communication system 1000 performs the communication between the station device 100 and the wireless access point 200 in the above embodiment, the same method is applied to a wireless communication system 1000 that performs communication between the station device 100 and a wireless router (not shown).

According to another exemplary embodiment, the station device 100 may check the communication performance by communicating with the wireless access point 200 via a set-top box (not shown).

Specifically, the station device 100 provides a screen for measuring communication performance on the display unit 120, and, upon receiving a user command through the input unit 110, the communication unit 140 transmits the input user command to the set-top box (not shown). The set-top box (not shown) communicates with the wireless access point 200 and determines the current communication performance with the wireless access point 200, stores the determined current communication performance, and compares the current communication performance with pre-stored previous communication performance. The set-top box (not shown) then transmits a result of comparison to the station device 100 such that the station device 100 performs an output according to the result of comparison.

Figure 2:
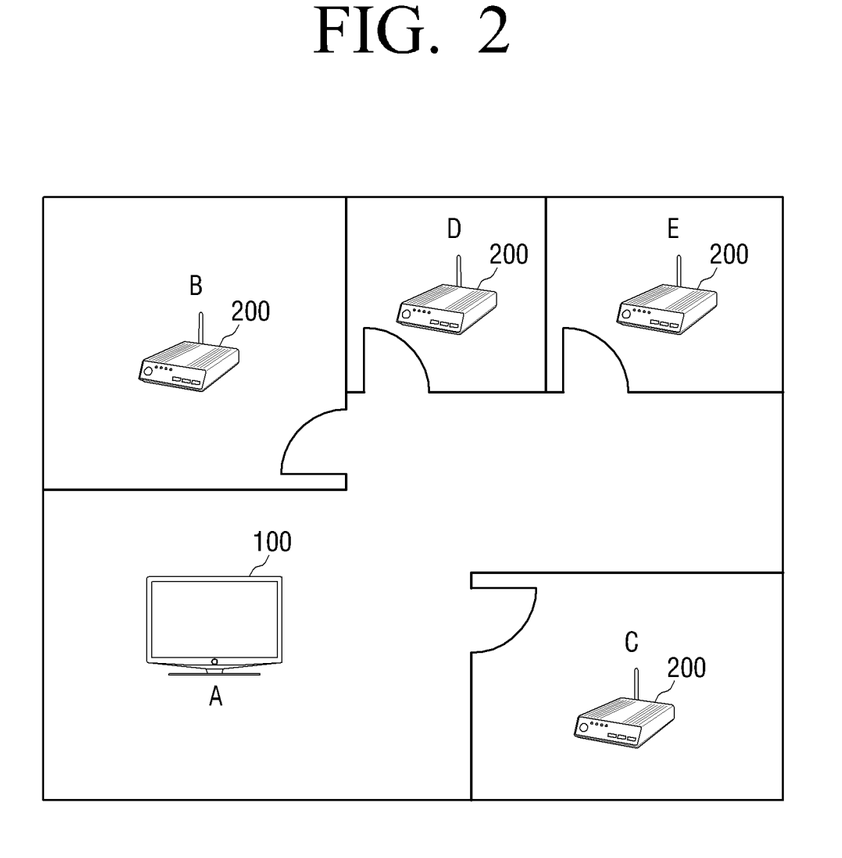
FIG. 2 is a view to explain a method for checking communication performance of a station device 100 according to an exemplary embodiment.

FIG. 2 is a view to explain a method for checking communication performance of the station device 100 according to an exemplary embodiment.

Referring to FIG. 2, an environment including the station device 100 and the wireless access point 200, that is, a home network environment, is illustrated by way of example.

In FIG. 2, the station device 100 is fixed in room A and the wireless access point 200 is placed in room B. If a user command to measure communication performance is input through the input unit 110, the station device 100 may be controlled by the controller 170 to display a screen for measuring the communication performance on the display unit 120.

The input unit 110 may use a test packet as one of various methods for measuring the communication performance of the wireless access point 200.

The station device 100 transmits the test packet to the wireless access point 200 and measures the communication performance between the station device 100 and the wireless access point 200.

If a user command is input through the input unit 110, the station device 100 transmits the test packet to the wireless access point 200 placed in room B and receives the test packet returning from the wireless access point 200 under control of the controller 170.

In this case, the station device 100 may iterate the operation of transmitting and receiving the test packet a predetermined number of times, which is input through the communication unit 140.

The determination unit 150 of the station device 100 checks the number of packets that are damaged during the iterating process and determines current communication performance according to the number of damaged packets.

In this case, the station device 100 may reduce a size of a packet to be transmitted next if a damaged packet is generated and may increase the size of the packet to be transmitted next if the station device 100 is successful in transmitting the packet, under control of the controller 170.

The above-described method may be an Iperf network testing method.

The station device 100 may measure a strength of a received signal, and measure communication performance between the station device 100 and the wireless access point 200. This method may be a received signal strength indication (RSSI).

The station device 100 may measure a signal to noise ratio (SNR) of a received signal and measure communication performance between the station device 100 and the wireless access point 200.

The station device 100 may store the current communication performance of the wireless access point 200 placed in room B.

The station device 100 may compare the current communication performance with entire communication performances which have been stored in the storage unit 160 before the wireless access point 200 is placed in room B.

If communication performance measured when the wireless access point 200 is placed in room D is already stored in the storage unit 160 and the communication performance measured when the wireless access point 200 is placed in room B is better than the communication performance measured when the wireless access point 200 is placed in room D, the station device 100 may output an alarm indicating that the current communication performance measured when the wireless access point 200 is placed in room B is the best communication performance.

If the current communication performance measured when the wireless access point 200 is placed in room B is the same as the previous communication performance measured when the wireless access point 200 is placed in room D, the station device 100 may output an alarm indicating that that the current communication performance of the wireless access point 200 placed in room B is the same as the previous communication performance measured when the wireless access point is placed in room D.

If the current communication performance measured when the wireless access point 200 is placed in room B is worse than the previous communication performance measured when the wireless access point 200 is placed in room D, no response may be output.

The station device 100 may repeatedly check communication performance at each location of the wireless access point 200 under the environment forming the home network with the station device 100 and the wireless access point 200, by moving the wireless access point 200 to room E and room C. Accordingly, since the user can find a place in which the station device 100 has the optimal network performance of the home network environment using a simple method, user's convenience is enhanced.

Figure 3:
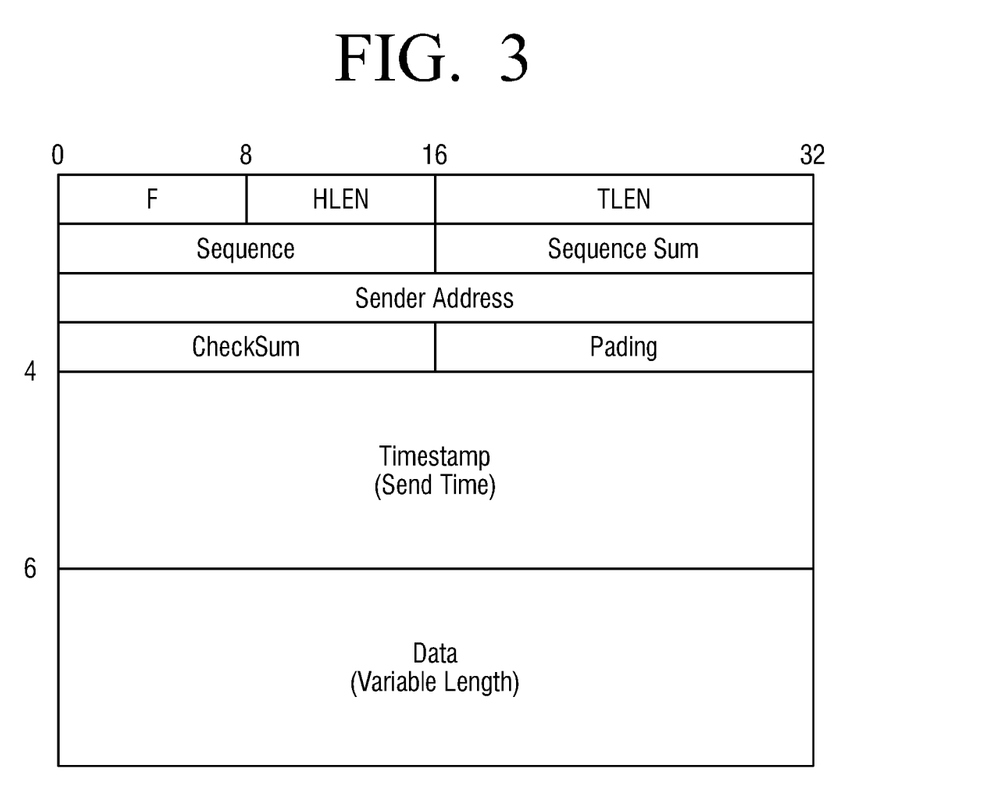
FIG. 3 is a view illustrating an example of a test packet.

FIG. 3 is a view illustrating an example of the test packet.

Referring to FIG. 3, a horizontal length of the test packet is 32 bits and a vertical length of the test packet is changeable depending on a size of a data area.

The test packet may include a header (F) area, a header length (HLEN) area, and a total length (TLEN) area, and a horizontal length of each area may be 8 bits.

One vertical line of the test packet including the F area, the HLEN area, and the TLEN area may be 4 bytes long.

A sequence area indicates the number of transmissions when the test packet is transmitted repeatedly and has a horizontal length of 16 bits.

A sequence sum area indicates the total number of transmissions when the test packet is transmitted repeatedly and has a horizontal length of 16 bits.

A sender address area indicates an IP address of the station device 100 and has a horizontal length of 32 bits.

A checksum area indicates whether the test packet is damaged or not and has a horizontal length of 16 bits.

A padding area defines remaining data when data of the test packet is transmitted on a predetermined basis. For example, if 1250-byte data of the test packet is transmitted on a vertical one line basis of the test packet, that is, on a 4-byte basis, 2-byte data remains. The padding area may indicate remaining data such as 2 bytes.

A time stamp area indicates a time at which the test packet is transmitted and has a horizontal length of 32 bits and a vertical length of 8 bits.

A data area indicates data of the test packet and has a horizontal length of 32 bits and a variable vertical length.

The size of data in the data area is changeable in the same way as the size of the packet to be transmitted next is reduced if a damaged packet is generated and is increased if packet transmission is successful, under control of the controller 170.

As described above, since the test packet obtains information regarding the number of iterations, whether or not the test packet is damaged, the data area in which the size of data is changeable, and the transmitting time during the process of transmitting and receiving the test packet, the test packet is useful in checking the communication performance between the station device 100 and the wireless access point 200.

Figure 4:
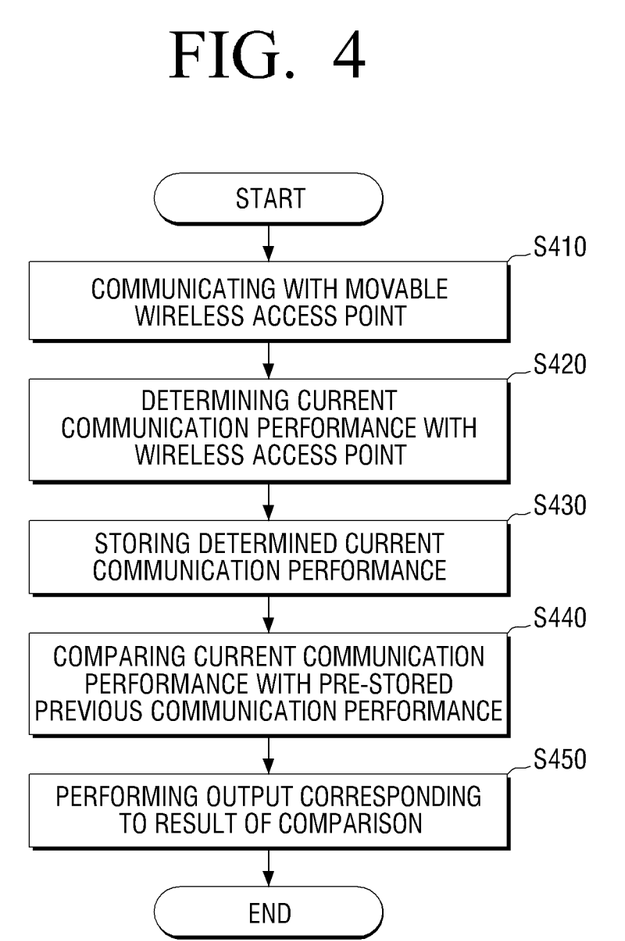
FIG. 4 is a flowchart illustrating a method for checking communication performance of a station device according to an exemplary embodiment.

However, the test packet is merely an example and is not limited to the above test packet example, and may be provided in other forms FIG. 4 is a flowchart illustrating a method for checking communication performance of the station device 100 according to an exemplary embodiment.

Referring to FIG. 4, in the method for checking the communication performance of the station device 100, the communication unit 140 communicates with the movable wireless access point 200 (S410).

The determination unit 150 determines current communication performance with the wireless access point 200 (S420). More specifically, the determination unit 150 may determine the current communication performance using various methods as described above with reference to FIGS. 1 and 2.

The storage unit 160 stores the determined current communication performance (S430).

The controller 170 compares the current communication performance with pre-stored previous communication performance (S440). The operation of comparing the current communication performance with the previous communication performance may be performed by the determination unit 150.

The output unit 130 performs an output corresponding to the result of comparison (S450).

Figure 5:
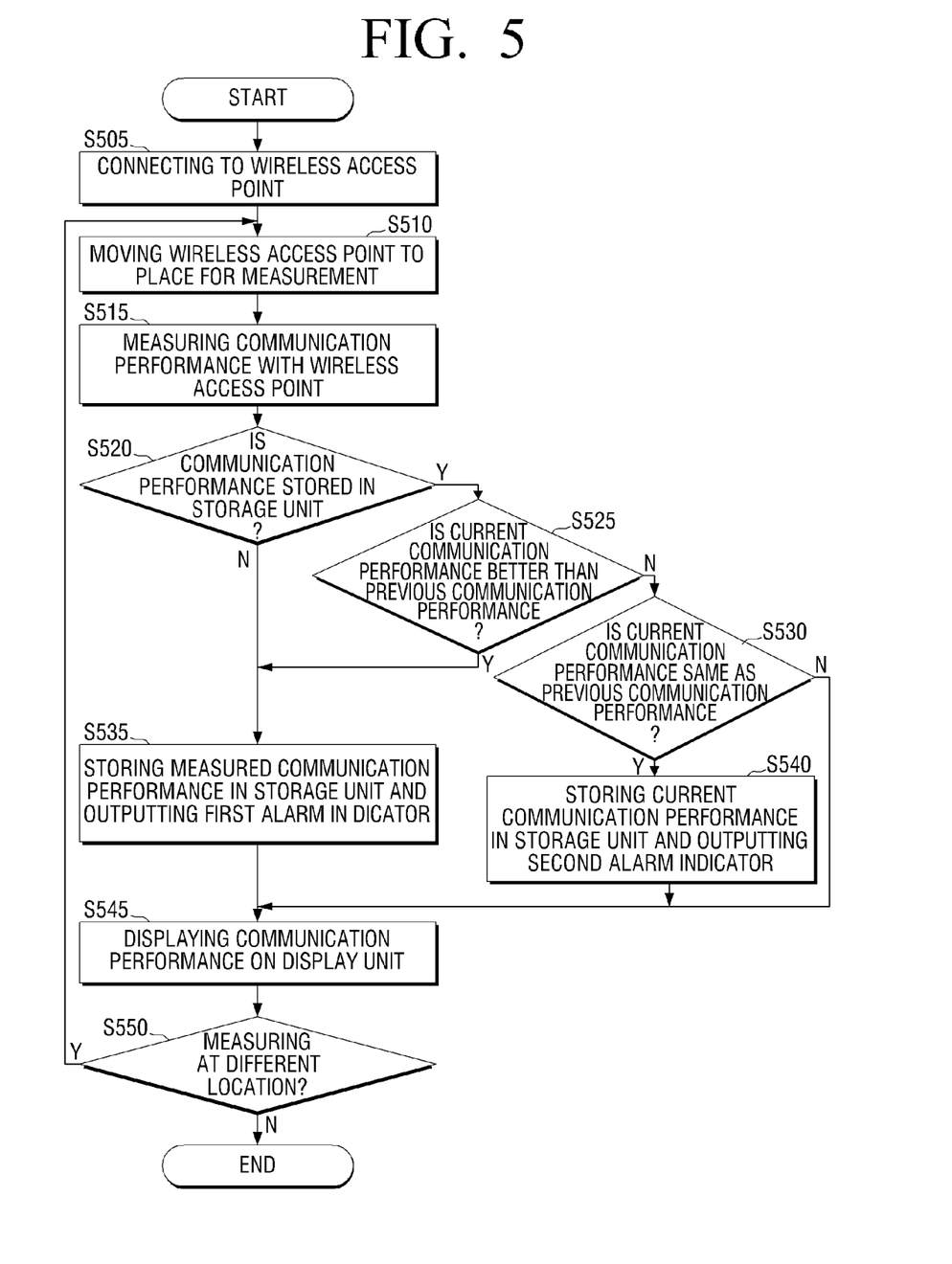
FIG. 5 is a flowchart illustrating a method for checking communication performance of a station device according to another exemplary embodiment.

FIG. 5 is a flowchart illustrating a method for checking communication performance of the station device 100 according to another exemplary embodiment.

Referring to FIG. 5, in the method for checking the communication performance of the station device 100, the station device 100 is connected to the wireless access point 200 via the communication unit 140 (S510).

In order to be connected to the wireless access point 200, the station device 100 may display a screen for connection on the display unit 120.

The wireless access point 200 is moved to a place where communication performance is to be measured (S520).

The order of operations S510 and S520 may be changed.

The communication performance of the wireless access point 200 is measured (S530).

The determination unit 150 determines whether previously measured communication performance is stored in the storage unit 160 or not (S520).

If it is determined that the previously measured communication performance is not stored (S520-N), the station device 100 stores the measured communication performance in the storage unit 160 and outputs a first alarm indicator, under control of the controller 170 (S535).

On the other hand, if it is determined that the previously measured communication performance is stored (S520-Y), it is determined whether the current communication performance is better than the previous communication performance or not (S525).

If it is determined that the current communication performance is better than the previous communication performance (S525-Y), the station device 100 stores the measured communication performance in the storage unit 160 and outputs the first alarm indicator, under control of the controller 170 (S535).

If it is determined that the current communication performance is not better than the previous communication performance (S525-N), it is determined whether the current communication performance is the same as the previous communication performance or not (S530).

If it is determined that the current communication performance is the same as the previous communication performance (S530-Y), the station device 100 stores the current communication performance in the storage unit 160 and outputs a second alarm indicator at a time, under control of the controller 170 (S540).

If it is determined that the current communication performance is not the same as or not better than the previous communication performance (operation 530-N), the station device 100 does not output an alarm indicator under control of the controller 170. In this case, the current communication performance may be stored in the storage unit 160.

After performing operations S535, S540, and S530-N, the station device 100 may display the communication performance on the display unit 120 under control of the controller 170 (S545).

For example, in operation S545, the display unit 120 may display the measured communication performance in the unit of bits-per-second (bps) or dBm, or may display the communication performance using messages "Good", "Bad", and "Very Good".

The station device 100 asks whether the user wishes to measure communication performance of the wireless access point 200 at a different location (S550).

If a user command to measure communication performance of the wireless access point 200 at a different location is input through the input unit 110, operation 510 resumes such that the above-described operations are performed once again.

If the user does not wish to measure communication performance of the wireless access point 200 at a different location, the station device 100 finishes measuring the communication performance of the wireless access point 200.

Figure 6:
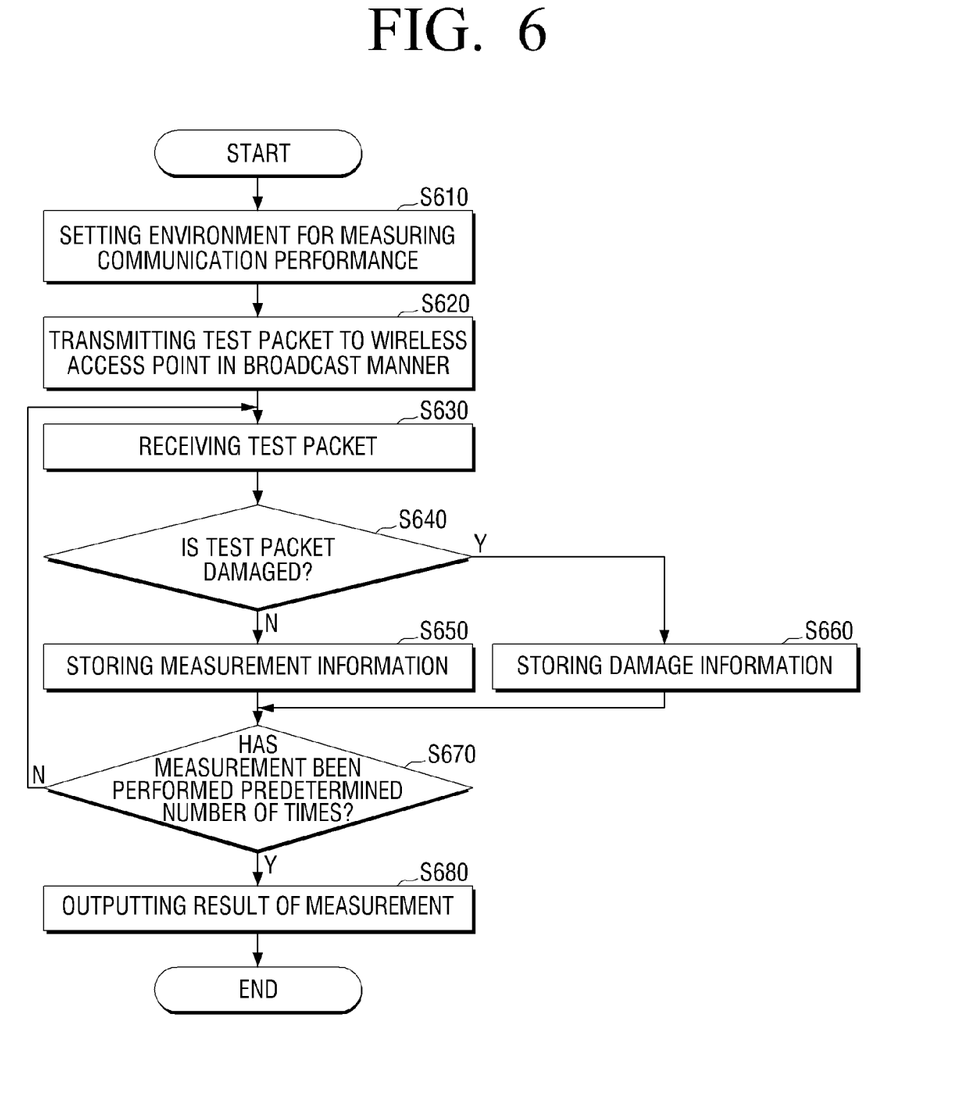
FIG. 6 is a flowchart illustrating an example of a method for measuring communication performance according to an exemplary embodiment.

FIG. 6 is a flowchart illustrating an example of a method for measuring communication performance.

Referring to FIG. 6, an environment for measuring communication performance is established (S610).

More specifically, the station device 100 executes a program stored in the storage unit 160 for measuring communication performance and sets various conditions such as a size of a packet, a measuring time, a way to output communication performance, the number of measurements, whether communication performance is stored or not.

The communication unit 140 transmits a test packet to the wireless access point 200 in a broadcast manner (S620), and receives the test packet returning from the wireless access point 200 (S630).

The determination unit 150 determines whether the test packet is damaged (S640).

The test packet may not be received at the station device 100 due to various factors, and if the test packet is not received at the station device 100, the determination unit 150 determines that the test packet is damaged.

Even though the test packet is received at the station device 100, it may be determined whether the test packet is damaged or not using a checksum.

If it is determined that the test packet is not damaged (640-N), measurement information, that is, measured communication performance is stored (S650).

On the other hand, if it is determined that the test packet is damaged (S640-Y), damage information is stored in the storage unit 160 (S660).

After operations S650 and S660, it is determined whether the operation of transmitting and receiving the test packet has been performed a predetermined number of times (S670).

If it is determined that the operation of transmitting and receiving the test packet has been performed the predetermined number of times (S670-Y), the measured result is output (S680).

If it is determined that the operation of transmitting and receiving the test packet has not been performed the predetermined number of times (S670-N), operation S630 resumes such that the test packet is received again.

Figure 7:
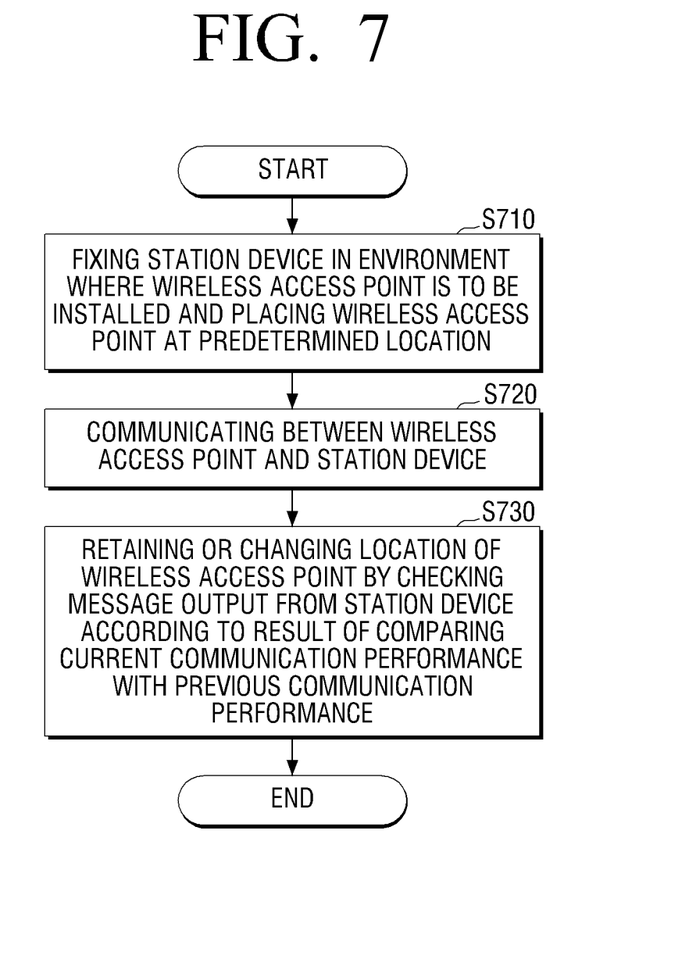
FIG. 7 is a flowchart illustrating a method for setting a location of a wireless access point according to an exemplary embodiment.

FIG. 7 is a flowchart illustrating a method for setting a location of the wireless access point 200 according to an exemplary embodiment.

Referring to FIG. 7, the method for setting the location of the wireless access point 200 fixes the station device 100 in an environment where the wireless access point 200 is to be installed and places the wireless access point 200 at a predetermined location (S710).

Communication is performed between the wireless access point 200 and the station device 100 (S720).

According to a result of comparing current communication performance with previous communication performance, a message output from the station device 100 is checked and the location of the wireless access point 200 is retained or changed (S730).

In the operation of retaining or changing the location of the wireless access point 200 (S730), the current communication performance may be compared with the communication performance that is stored in the storage unit 160 of the station device 100.

Accordingly, the location of the wireless access point 200 is set so that the wireless access point 200 has the best communication performance.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for checking communication performance of a station device, the method comprising:
communicating with a wireless access point which is movable from one place to another place;
determining a current communication performance with the wireless access point;
storing the determined current communication performance;
comparing the current communication performance with a previous communication performance which was previously stored; and
performing an output according to a result of the comparing,
wherein the determining the current communication performance comprises iterating an operation of transmitting a test packet to the wireless access point and receiving the test packet returning from the wireless access point a predetermined number of times, determining a number of packets that are damaged during the iterating the operation, and determining the current communication performance according to the number of damaged packets.

2. The method as claimed in claim 1, wherein the performing the output according to the result of the comparison comprises:
outputting a first message if the result of the comparing indicates that the current communication performance is better than the previous communication performance; and
outputting a second message if the result of the comparing indicates that the current communication performance is the same as the previous communication performance.

3. The method as claimed in claim 2, wherein the performing the output according to the result of the comparison comprises not outputting a message if the result of the comparing indicates that the current communication performance is worse than the previous communication performance.

4. The method as claimed in claim 1, further comprising, by the station device, reducing a size of a packet to be transmitted next if a damaged packet is generated, and increasing the size of the packet to be transmitted next if the transmitting of the test packet is successful.

5. The method as claimed in claim 1, wherein the station device includes a television that wirelessly communicates with the wireless access point.

6. A method for setting a location of a wireless access point, the method comprising:
fixing a station device in an environment where the wireless access point is to be installed and placing the wireless access point at a predetermined location;
communicating between the wireless access point and the station device; and
retaining or changing the location of the wireless access point by checking a message output from the station device according to a result of comparing current communication performance with previous communication performance,
wherein the communicating between the wireless access point and the station device comprises iterating an operation of transmitting a test packet to the wireless access point and receiving the test packet returning from the wireless access point a predetermined number of times, determining a number of packets that are damaged during the iterating the operation, and determining the current communication performance according to the number of damaged packets.

7. A station device comprising:
an output unit that outputs a message;
a communication unit that communicates with a wireless access point which is movable from one place to another place;
a determination unit that determines current communication performance with the wireless access point;
a storage unit that stores the determined current communication performance; and
a controller that compares the current communication performance with pre-stored previous communication performance and controls the output unit to output a message according to a result of the comparison,
wherein the controller controls the communication unit to iterate an operation of transmitting a test packet to the wireless access point and receiving the test packet returning from the wireless access point a predetermined number of times, and
wherein the determination unit determines a number of packets that are damaged during the iterating of the operation and determines the current communication performance according to the number of damaged packets.

8. The station device as claimed in claim 7, wherein the controller controls the output unit to output a first message if the result of the comparison indicates that the current communication performance is better than the previous communication performance and output a second message if the result of the comparison indicates that the current communication performance is the same as the previous communication performance.

9. The station device as claimed in claim 8, wherein the controller does not output a message if the result of the comparison indicates that the current communication performance is worse than the previous communication performance.

10. The station device as claimed in claim 7, wherein the controller reduces a size of a packet to be transmitted next if a damaged packet is generated, and increases the size of the packet to be transmitted next if the transmitting of the test packet is successful.

11. The station device as claimed in claim 7, wherein the station device includes a television that wirelessly communicates with the wireless access point.

* * * * *